(12) United States Patent
Block et al.

(10) Patent No.: US 7,506,404 B2
(45) Date of Patent: Mar. 24, 2009

(54) CASTER HAVING A RUNNING WHEEL

(75) Inventors: Wolfgang Block, Wermelskirchen (DE); Manfred Milbredt, Remscheid (DE)

(73) Assignee: TENTE GmbH & Co. KG, Wermelskirchen (DE)

( * ) Notice: Subject to any disclaimer, the term of this patent is extended or adjusted under 35 U.S.C. 154(b) by 156 days.

(21) Appl. No.: 11/630,805

(22) PCT Filed: Apr. 20, 2005

(86) PCT No.: PCT/EP2005/051749

§ 371 (c)(1),
(2), (4) Date: Dec. 27, 2006

(87) PCT Pub. No.: WO2006/008198

PCT Pub. Date: Jan. 26, 2006

(65) Prior Publication Data

US 2008/0115324 A1 May 22, 2008

(30) Foreign Application Priority Data

Jul. 21, 2004 (DE) .................... 10 2004 035 220

(51) Int. Cl.
*A47L 9/00* (2006.01)
(52) U.S. Cl. .................... 16/18 R; 16/35 R; 188/1.12
(58) Field of Classification Search .............. 16/18 R, 16/45, 35 R, 97, 31 R, 31 A; 188/1.12
See application file for complete search history.

(56) References Cited

U.S. PATENT DOCUMENTS 2,962,126 A * 11/1960 Legge .................... 188/74
3,988,800 A * 11/1976 Sachser .................... 16/35 R
4,722,114 A * 2/1988 Neumann .................... 16/35 R
5,014,391 A * 5/1991 Schulte .................... 16/35 R
5,303,450 A * 4/1994 Lange .................... 16/35 D
6,321,878 B1 * 11/2001 Mobley et al. .............. 188/1.12
6,584,641 B1 * 7/2003 Milbredt .................... 16/35 R
6,865,775 B2 * 3/2005 Ganance .................... 16/35 R
7,182,178 B2 * 2/2007 Chung .................... 188/1.12

FOREIGN PATENT DOCUMENTS

| DE | 36 02 916 A1 | 6/1987 |
| DE | 41 37 757 A1 | 5/1993 |
| DE | 299 14 681 U1 | 12/2000 |
| DE | 102 30 764 A1 | 5/2003 |
| JP | 05262101 A * | 10/1993 |

OTHER PUBLICATIONS

International Search Report.

* cited by examiner

*Primary Examiner*—William L. Miller
(74) *Attorney, Agent, or Firm*—Collard & Roe, P.C.

(57) ABSTRACT

The invention relates to a caster comprising a trailing wheel, a fork and an assembly journal. The fork can be swiveled in relation to the assembly journal and inside the fork a braking device is disposed which can be displaced into the braking position via a tappet actuated by a trip cam. The aim of the invention is to provide a direction-lockable caster that has a simple design. For this purpose, the tappet interacts with a direction locking part mounted stationarily on the fork, when spring biased into a direction locking position.

13 Claims, 5 Drawing Sheets

CASTER HAVING A RUNNING WHEEL

CROSS REFERENCE TO RELATED APPLICATIONS

Applicants claim priority under 35 U.S.C. §119 of German Application No. 10 2004 035 220.8 filed Jul. 21, 2004. Applicants also claim priority under 35 U.S.C. §365 of PCT/EP2005/051749 filed Apr. 20, 2005. The international application under PCT article 21(2) was not published in English.

BACKGROUND OF THE INVENTION

1. Field of the Invention

The invention relates to a caster having a running wheel, a fork and a mounting pin, the fork being pivotable relative to the mounting pin and, furthermore, the fork having disposed in it a braking device which can be displaced into the braking position by a push rod actuated via a control cam.

2. Prior Art

Casters of the generic type, for example for hospital beds, transport units or the like have been known for a long time from the prior art. These casters usually comprise a vertically projecting mounting pin via which the caster can be secured on the hospital bed or the like. Such a caster usually has disposed within it a braking device which can be displaced in the direction of the running wheel of the caster, in order to block the running wheel, via a control lever disposed transversely in the mounting pin, for example by someone operating the lever by foot. Casters which have, in the fork interior, structural elements by means of which the swiveling caster can also be used as a fixed-caster are also known.

From DE 10230764 A1, a caster of this kind is known having a sleeve part which is fixed axially in the mounting pin and in which the push rod is accommodated in a vertically movable manner. This sleeve part has a blocking protrusion which interacts with a blocking receiver on a likewise axially fixed blocking part. Interaction between the blocking protrusion and the blocking receiver takes place irrespective of a control position.

SUMMARY OF THE INVENTION

Taking the abovementioned prior art as the departure point, it is an object of the invention to provide a caster which is of straightforward construction and has directional locking.

This object is achieved first and foremost in the case of a caster as shown and described herein, this being based on the push rod interacting with a fork-mounted direction-locking part, with spring biasing into a direction-locking position.

Such a configuration has resulted in the further development of a push rod for a caster such that this push rod interacts directly with the fork-mounted direction-locking part, under spring biasing, in order to fix the caster in a pivotable manner at least in one position. The push rod, at the same time, is the operative part in respect of the directional locking. The push rod has a double function. On the one hand, the push rod brakes and/or fully locks the running wheel via the control actuation and accompanying downward displacement. On the other hand, however, it interacts directly with the direction-locking part in respect of a fixed-caster position, this being done with spring biasing into a position opposed to the braking position, for example, utilizing an axially acting spring which forces the push rod into the braking-release position. In functional terms, it is not just the downward displacement but also the upward displacement of the push rod which is utilized. The spring biasing into the direction-locking position, which is active on a constant basis, makes it possible to influence pivotability in respect of smooth or sluggish operation.

The subject matters of additional embodiments are also shown and described.

It thus proves to be advantageous for the push rod to have a latching structure which interacts with a latching recess of the direction-locking part. The latching recess of the direction-locking part here is correspondingly adapted to the latching recess of the push rod for secure interengagement. As an alternative, it may be provided that the push rod has the latching recess and the direction-locking part has the latching structure. It is further preferably proposed that the direction-locking position can be released solely by a torque acting on the running wheel. This means that, if the caster is positioned, for example, on a hospital bed and the fixed-caster position is activated via the fork-mounted direction-locking part, a person operating the bed is able to push the hospital bed more easily in a straight line, for example along a long narrow corridor. If it is desired, as needs be, to change the pushing direction, the person operating the bed can subject the caster to a torque, via the bedstead, transversely to the pushing direction in order to cancel the spring-biased direction-locking position. This position may be defined, for example, via a pivoting latching angle of 180°. As an alternative, it is also possible to provide other latching angles. A further advantage also exists in the latching structure being formed on a latching plate formed integrally with the push rod. This gives rise to structural simplification and, furthermore, to a reduction in weight. The latching plate preferably has a circular basic contour. A latching plate formed with an angular basic contour is likewise possible. In respect of the latching structure, it is proposed that this is an approximately rib-like formation and runs coaxially with the push-rod axis. Configuring the latching structure in pin form is also possible. Provision may also be made for a plurality of latching structures to be formed from the latching plate. It is preferred, in this respect, to have a diametrical arrangement both for the latching structures of the latching plate and for the cup-like latching recesses of the direction-locking part which interact therewith. To this end, the latching recesses for the above described configuration are to be adapted correspondingly in terms of orientation. A further structural simplification is achieved by the push rod having rotation-blocking protrusions for interacting with the braking device for full locking, the rotation-blocking protrusions being integrally formed on the latching plate in the opposite direction to the latching structure. It is possible here for the rotation-blocking protrusions to be of approximately cylindrical configuration with a circular cross-section and to run coaxially in each case with the push-rod axis, enclosing the latter in the process in the form of part of a circle. The rotation-blocking protrusions may be spaced apart from one another by an angle of between 5 and 20° in each case. Furthermore, it may be provided that the rotation-blocking protrusions engage in blocking receivers of a blocking part when the push rod is lowered. In this case, the blocking receivers of the fork-mounted blocking part, which is disposed between the latching plate and the braking device, are adapted to the basic contour of the rotation-blocking protrusions, and the coaxial arrangement thereof around the push rod, in order to achieve rapid and secure engagement of the rotation-blocking protrusions in the blocking receivers during a lowering movement. According to the invention, as has already been mentioned in the introduction, the push rod performs a double function. On the one hand, upon control-cam actuation, for example by the person operating the bed, and an accompanying vertical lowering movement, the push rod is provided for activating the braking device, which interacts with the running wheel, and, as needs be, full locking (locking of rotary and pivoting movements). On the other hand, in the case of a vertical spring-biased upward displacement, that is to say when it does not operate along with the braking device, the push rod interacts with the direction-locking part in order for the caster to be utilized as a fixed roller. Furthermore, it is also provided that the blocking part is formed separately from the push rod and the braking device. In this respect it is provided that the blocking part and/or the direction-locking part are/is formed as metal parts in each case, while at any rate the braking device and/or that part of the push rod which has the latching plate are/is formed as plastics parts. The braking device may also consist of a plastics material. It is also possible to produce the push rod from a metal material, while the latching plate, formed from plastics material, is screwed or injection-molded, for example, onto the push rod. It is preferred, however, for the push rod and the latching plate to be produced in one piece from a strong plastics material.

In addition, it is proposed that, in its upper part, the push rod is formed as a mating cam in relation to the control cam, the mating cam being formed on a separate cam part and being screw-connected to the push-rod portion having the latching structure. For this purpose, the cam part has a central blind bore with an internal thread. The push rod has an external thread at its upper end. In relation to a fixedly-disposed cam part, a cam part which can be screwed onto the push rod has the advantage that it can be adjusted in length, via the screw-connection, in the axial direction of the push rod. This has an effect, in particular, on the displacement path of the push rod, which can be displaced via the control cam. Furthermore it is proposed that the push rod is spring-biased in the direction of the control cam. As a result, the push rod and the latching plate integrally formed thereon, and the latching structure formed integrally on the latching plate, always try to execute a vertically upwardly directed displacement, that is to say in the direction of the direction-locking part, away from the braking device. The upward displacement of the push rod here is advantageously inhibited by the fork-mounted direction-locking part.

The push rod passes through a central opening in the direction-locking part. The latching plate has its latching structure supported on the direction-locking part. This support, in the first instance, provides for the steering function of the caster, as needs be, until, when the caster is pivoted about the mounting axis, the latching structure of the latching plate is oriented in a congruent manner in relation to the latching recess of the direction-locking part. If this is the case, the latching structure is caused to engage in the latching recess by the spring biasing, the fixed-caster position being achieved as a result. It is also advantageous if the spring acts on the cam part, the spring being the already known push-rod spring, which encloses the push rod and is also responsible for the push rod interacting with the fork-mounted direction-locking part.

The control cam may advantageously have just two control positions, one control position of the control cam defining the direction-locking position, and the braking position or full-locking position being brought about via the other control position. If the push rod is structurally modified, it may be provided that, following deactivation of the braking device, the push rod remains in a third position, so that the caster, without any latching, can be pivoted freely.

BRIEF DESCRIPTION OF THE DRAWINGS

The invention is explained hereinbelow with reference to the accompanying drawings, which however shows just one exemplary embodiment. In the drawings.

DETAILED DESCRIPTION OF THE DRAWINGS

Figure 1:
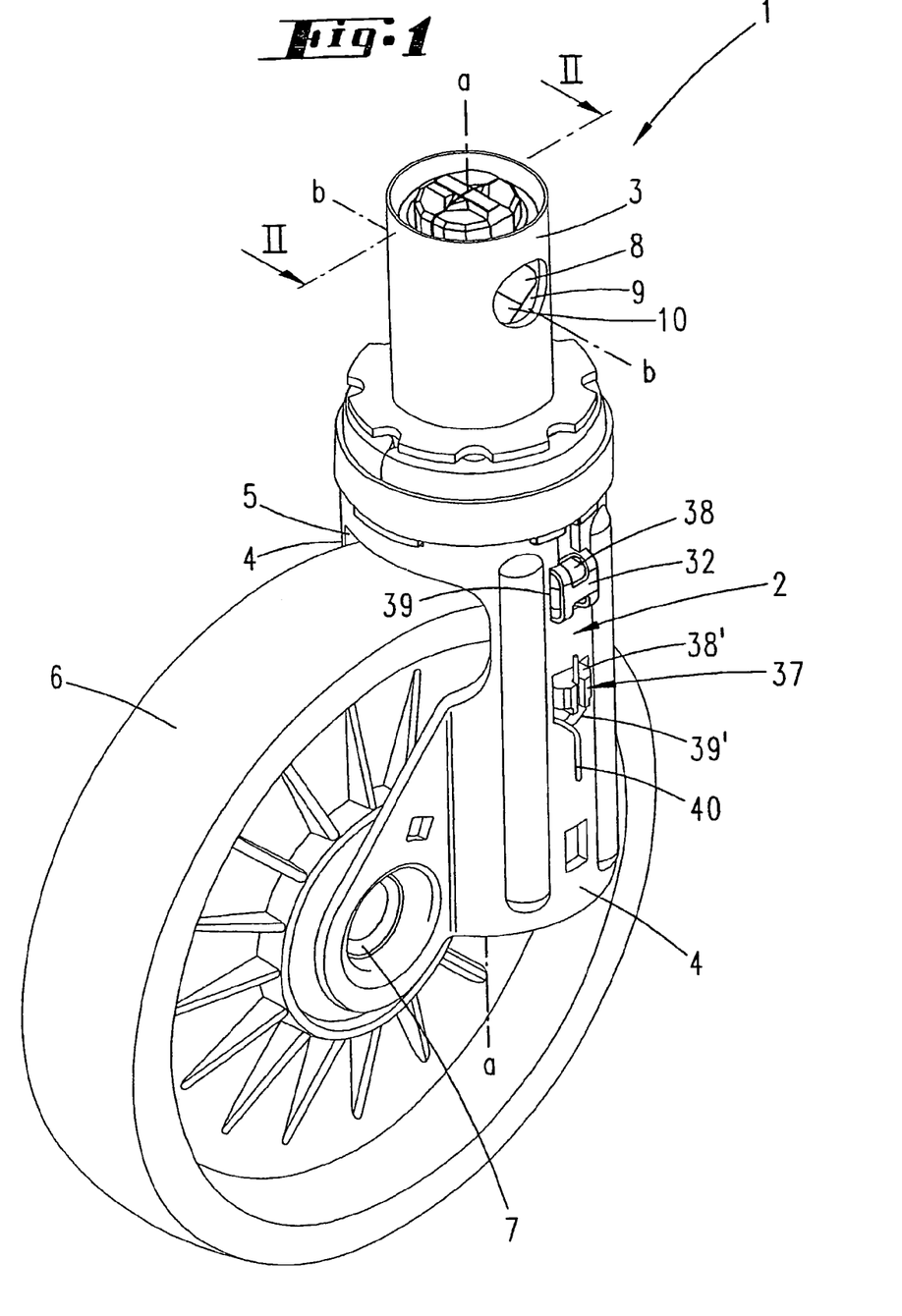
FIG. 1 shows a caster according to the invention illustrated in perspective.

Illustrated and described in first instance, with reference to FIG. 1, is a caster 1 having a caster fork 2 from which a cylindrically-configured mounting pin 3 projects vertically, enclosing a pivot axis a in the process. The caster fork 2 has its fork legs 4, which are disposed congruently opposite one another, flanking a running wheel 6 which is mounted in a fork cavity 5. Serving for mounting the running wheel 6 is a hollow axle 7, which passes through the running wheel 6 centrally and is secured at the ends of the fork legs 4 in each case.

The caster 1 illustrated may be positioned, for example, on a hospital bed or the like. Securing is then effected in a conventional manner and is therefore not described in any more detail here.

Provided at a known location in the mounting pin 3 is a control cam 8, which is disposed such that it can be pivoted about an actuating axis b. The actuating axis b here is oriented at right angles to the pivot axis a of the caster 1. Fixing of the control cam 8 within the mounting pin 3 is effected in known manner via a securing sleeve 9 which is oriented about the pivot axis a. In order for the control cam 8 to be carried along in rotation, the latter has a centrally-disposed, non-circular coupling opening 10 which has a control-lever shank 11 passing through it, the cross-section of this shank being adapted, for form-fitting purposes, to the cross-section of the coupling opening 10.

Figure 6:
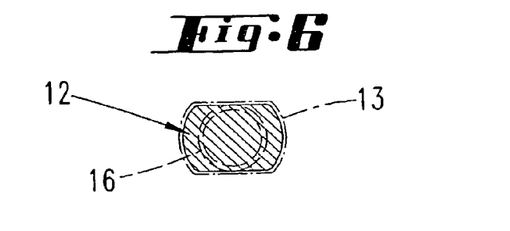
FIG. 6 shows a cross-section through the core of the push rod with a bearing opening for the mounting pin illustrated by chain-dotted lines.

Referring to the illustrations, a push rod 12 is provided beneath the control cam 8. This push rod can be displaced vertically in the mounting pin 3 in a state in which it is oriented about the pivot axis a. The mounting pin 3 has a reduced-diameter push-rod passage 13 oriented about the pivot axis a, the cross-section of the push-rod passage 13 being adapted to the cross-section of the push rod. The basic contour of the cross-section of the push rod 12 and of the push-rod passage 13 is approximately rectangular with convexly-shaped narrow sides (see, in particular, the illustration in FIG. 6). The push rod 12 is thus secured in terms of rotation within the mounting pin 3.

Figure 2:
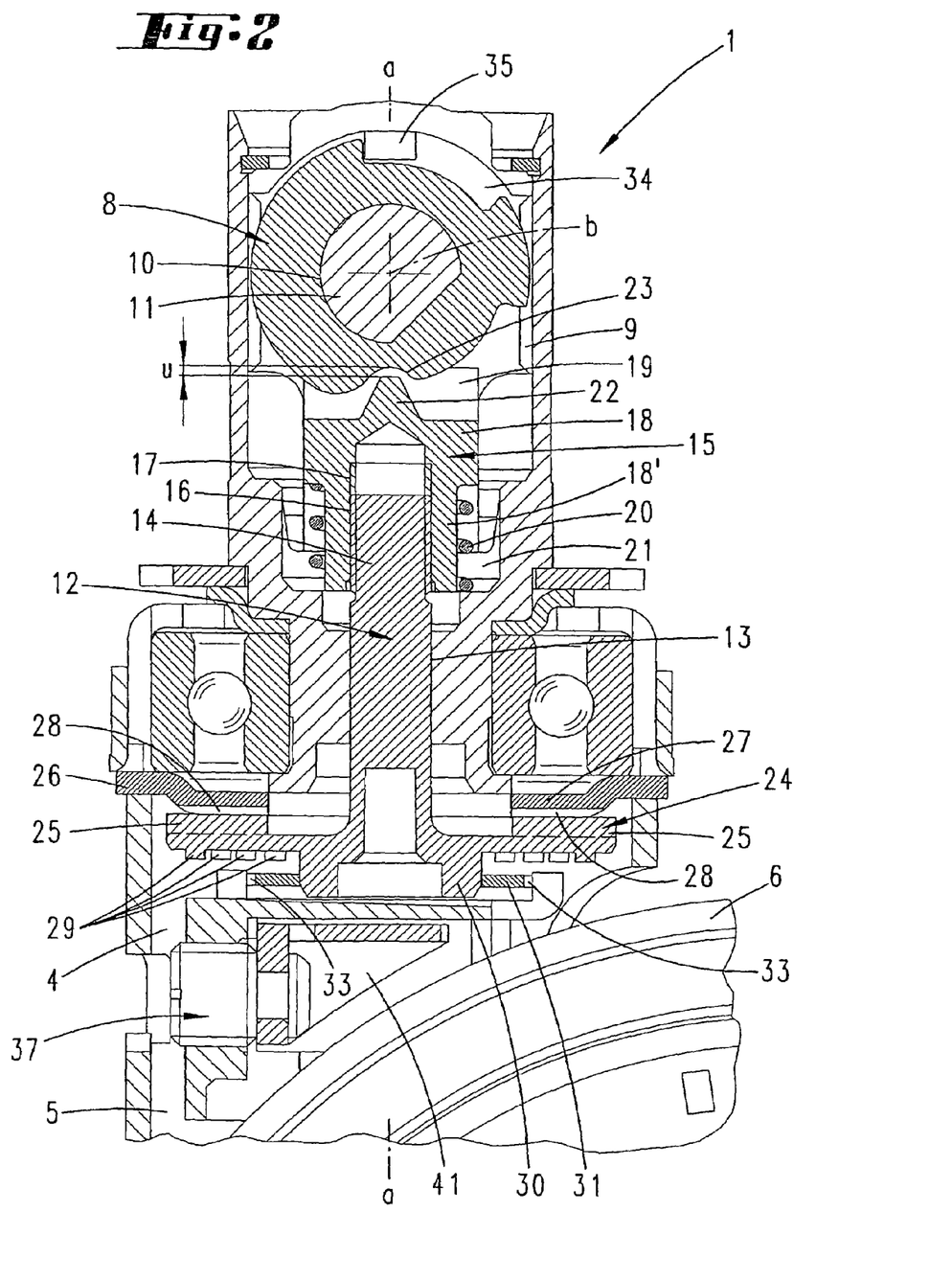
FIG. 2 shows a sectional illustration along line II-II in FIG. 1, relating to a swiveling caster function.

As the illustration in FIG. 2 shows, the free end 14 of the push rod 12, this end being disposed between the opening of the push-rod passage 13 and the control cam 8, is screw-connected to a cam part 15. For this purpose, the free end 14 of the push rod 12 has an external thread 16 which meshes with an internal thread 17 introduced centrally in the cam part 15. The cam part 15 is of cup-like configuration with a circular cross-section, an enlarged-diameter region being formed as an annular collar 18 at the end which is directed away from the push rod 12. Furthermore, the cam part 15 of the push rod 12 is guided vertically, as seen in the illustrations, within the mounting pin 3. For this purpose, the mounting pin 3 has a cavity 19 which encloses the pivot axis a and is adapted to the diameter of the annular collar 18. Furthermore, the portion 18' of the cam part 15, this portion being reduced in diameter in relation to the annular collar 18, is enclosed by a compression spring 20, one end of the compression spring 20 being supported on the underside of the annular collar 18. The other, opposite end of the spring is supported on a periphery of a further cavity 21, which encloses the pivot axis a and forms a guide. This cavity is adapted in diameter to the diameter of the portion 18' of the cam part 15. The push rod 12 is thus biased in the direction of the control cam 8 by means of the compression spring 20. Furthermore, that end surface of the annular collar 18 which is directed toward the control cam 8 has a central structure in the form of a mating cam 22.

As can be seen in FIG. 2, the mating cam 22, on the one hand, is enclosed by a concavely-formed control hollow 23 of the control cam 8 but, on the other hand, is spaced apart from the base of the control hollow 23 by a distance u.

Figure 5:
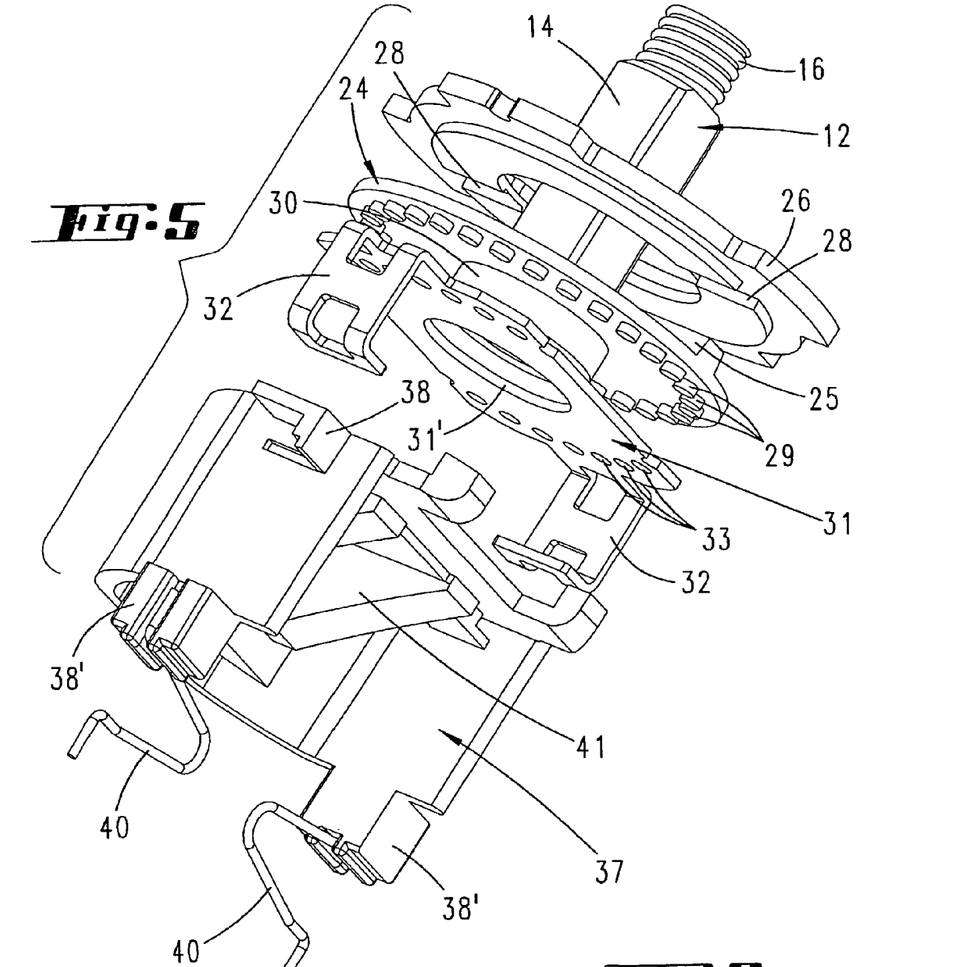
FIG. 5 shows, in exploded perspective view, the structural elements pertinent to the invention.

The push rod 12 extends further into the fork cavity 5 as seen in the direction of the running wheel 6. This cavity encloses a cross-sectionally circular structure formed integrally on the push rod 12. The enlarged-diameter integral structure performs the function of a latching plate 24 which, enclosing the pivot axis a, is formed integrally on the push rod 12 transversely to this pivot axis. On its surface which is directed towards the control cam 8, the latching plate 24 has two oppositely disposed latching structures 25 which are of approximately rib-like formation and each have a trapezoidal cross-section. As an alternative, the latching plate 24 may also have more than two latching structures 25. In the swiveling caster setting, these latching structures 25 are pushed, as a result of the force of the compression spring 20, into surface engagement against the underside of a direction-locking part 26. The locking part 26 which is of larger diameter than the latching plate 24 is secured in a rotationally fixed manner on the fork 2 and is in the form, for example, of a part formed by punching and bending. The locking part 26 which is of annular configuration and is disposed centrally in relation to the pivot axis a, has a circular, plateau-like structure 27 which is directed toward the running wheel 6 and, for its part, has two diametrically opposed latching recesses 28 oriented transversely to the pivot axis a. These latching recesses 28 may be considered, for all practical purposes, as a negative of the latching structures 25 of the latching plate 24 (see, in particular, the illustration in FIG. 5). It is also possible for the locking part 26, like the latching plate 24, to have more than two latching structures.

On the underside of the latching plate 24, the underside being directed away from the latching structures 25, the push rod 12 has rotation-blocking protrusions 29. These run in the circumferential direction of the latching plate 24 in each case, coaxially with the pivot axis a, and have an approximately cylindrical configuration. In this exemplary embodiment, the protrusions 29 are spaced apart from one another by an angle of 12°. Other angle spacings would also be possible.

From the latching plate 24, a circular, cylinder-shaped extension 30, which is reduced in diameter in relation to the latching plate 24, extends from the push rod 12, as seen in the direction of the running wheel 6, this extension, for its part, being positioned for guidance in a centrally-located through-passage opening 31' in a rotation-blocking part 31 disposed about the pivot axis a. This blocking part 31, which is positioned in the fork cavity 5 between the running wheel 6 and the latching plate 24, is, like the direction-locking part 26, secured in a rotationally fixed manner on the fork 2 and in the form, for example, of a part which has been formed by punching and bending. The blocking part 31 substantially comprises a plate of approximately rectangular basic contour. Rooted on the narrow sides of this plate in each case are two diametrically opposed extension arms 32 which are of cage-like configuration and via which the blocking part 31 is secured on the legs 4 of the fork 2. Furthermore, in the region of the plate, the blocking part 31 has blocking receivers 33 which run coaxially with the pivot axis a, are disposed around the opening 31', at a spacing therefrom, and are circular in cross-section. The dimensions here, that is to say the length and diameter of the blocking receivers 33, are adapted to those of the rotation-blocking protrusions 29 of the latching plate 24.

FIG. 2, which illustrates the steering position of the caster 1, shows the latching structures 25 disengaged from the latching recesses 28. These allow the running wheel 6 to rotate, in the exemplary embodiment, through more or less 180° about the pivot axis a. In the pivoting position of the caster 1, correspondingly, there is no latching action. The latching structures 25 of the push rod 12, which are responsible for locking the steering function, are located against the plateau-like structure 27 by means of biasing of the compression spring 20 or, in the case of steering actuation of the caster 1, slide along the same on account of the spring bias until the latching structures 25 and the latching recesses 28 are oriented in a congruent manner in relation to one another and are caused by the spring biasing to interact with latching action.

Figure 3:
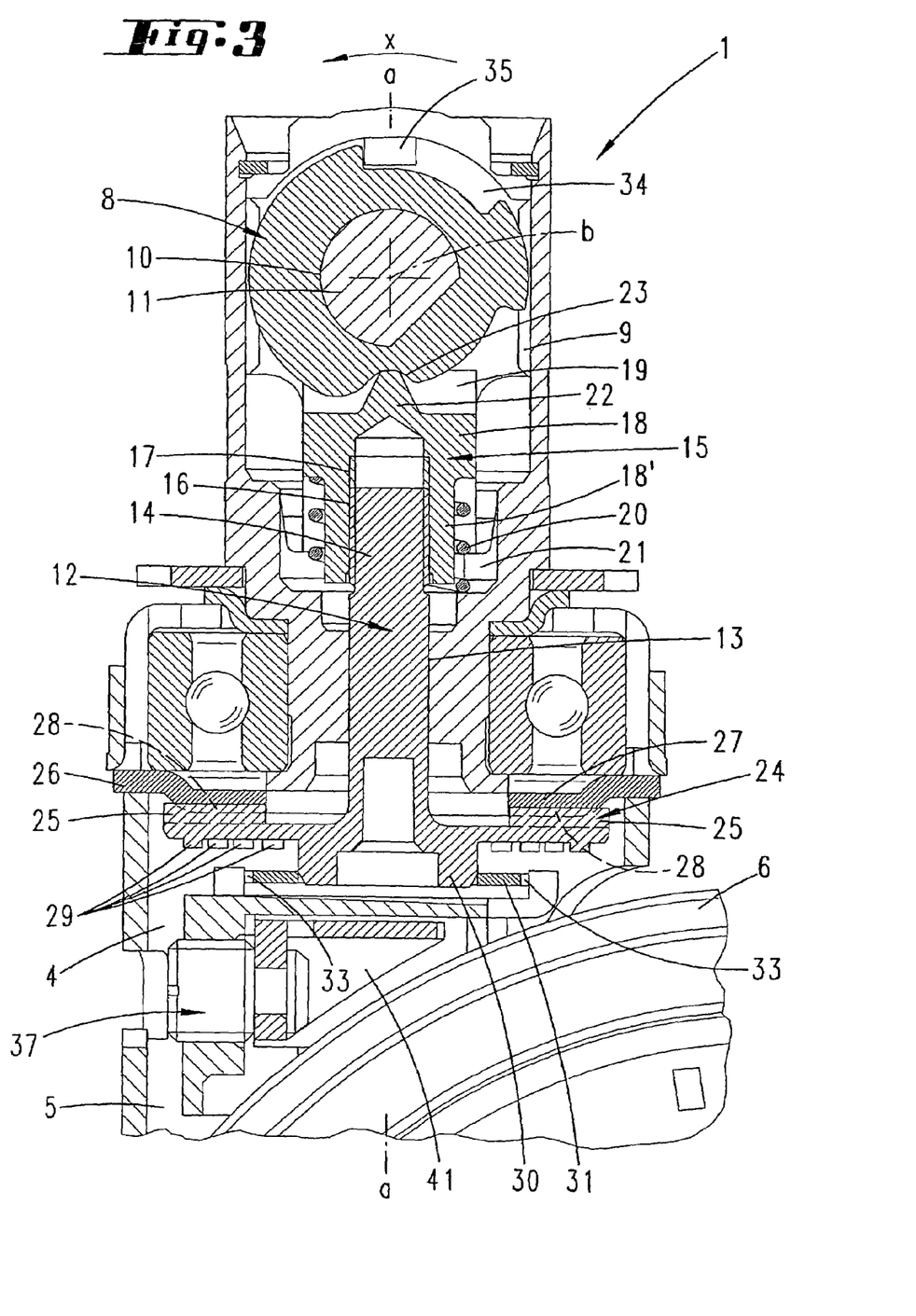
FIG. 3 shows a sectional illustration like the illustration in FIG. 2, the caster performing the fixed-caster function as a result of the push rod being displaced axially upwards.

If, for example, the caster 1 is secured on a hospital bed, the fixed position of the caster 1, for allowing the bed to be pushed more easily straight ahead, may be considered, for all practical purposes, as the basic position, so that both the latching structures 25 and the latching recesses 28 have their longitudinal extents oriented in the pushing or rolling direction of the running wheel—or substantially oriented in this direction: preferred rolling direction of the object on which the running wheel is mounted. In this fixed-caster position, the latching structures 25 of the push rod 12 are positioned with rotary locking action in the latching recesses 28 of the fork-mounted direction-locking part 26, under the bias of the compression spring 20. As can be seen in FIG. 3, the distance u, which forms a clearance between the mating cam 22 and the control hollow 23, can also be closed up by the latching structures 25 engaging in the latching recesses 28 of the upwardly displaced push rod 12, so that the mating cam 22 is supported in a spring-loaded manner on the base of the control hollow 23.

The depth to which the latching structures 25 penetrate into the latching recesses 28 conforms with the depth to which the mating cam 22 penetrates into the control hollow 23, or the distance u, in the disengaged position of the push rod according to FIG. 2. The caster 1 thus passes, without control-lever actuation, into the fixed-caster position in order for the hospital bed or the like to move straight ahead. The distance u may, for example, be of the order of magnitude of 1 mm. In this case, in the position according to FIG. 2, a distance which is at least equal, and preferably one which is greater by one and half times or more, remains in the downward direction, until the full-locking position has been reached.

If it is required, as needs be, to enable the steering function of the caster 1, this can be carried out while the caster 1, positioned on a hospital bed or the like, is running, by means of a torque being exerted on the caster 1 transversely to the running direction. This can be done, for example, by the person operating the hospital bed pivoting the latter to the left or right. The torque which is applied to the caster fork 2 and, in respect of the resultant force, has to be greater than the force of the compression spring 20, displaces the rotationally fixed push rod 12 in the direction of the running wheel 6. On account of the pivoting movement, the fork-mounted direction-locking part uses the oblique flanks of the latching recesses 28 to force the latching structures 25, which likewise have oblique flanks, out of the latching recesses 28 and, in the process, displaces the push rod 12 downward until the latching structures 25 are located in face-to-face engagement against the plateau-like structure 27, as seen in the illustration in FIG. 2. The level of the releasing torque is dependent primarily on the force of the compression spring 20. If a fixed position of the caster 1 is then desired again, this can be achieved by pivoting the caster 1 into the direction-locking position, in which the latching structures 25 enter with locking action into the latching recesses 28.

Figure 4:
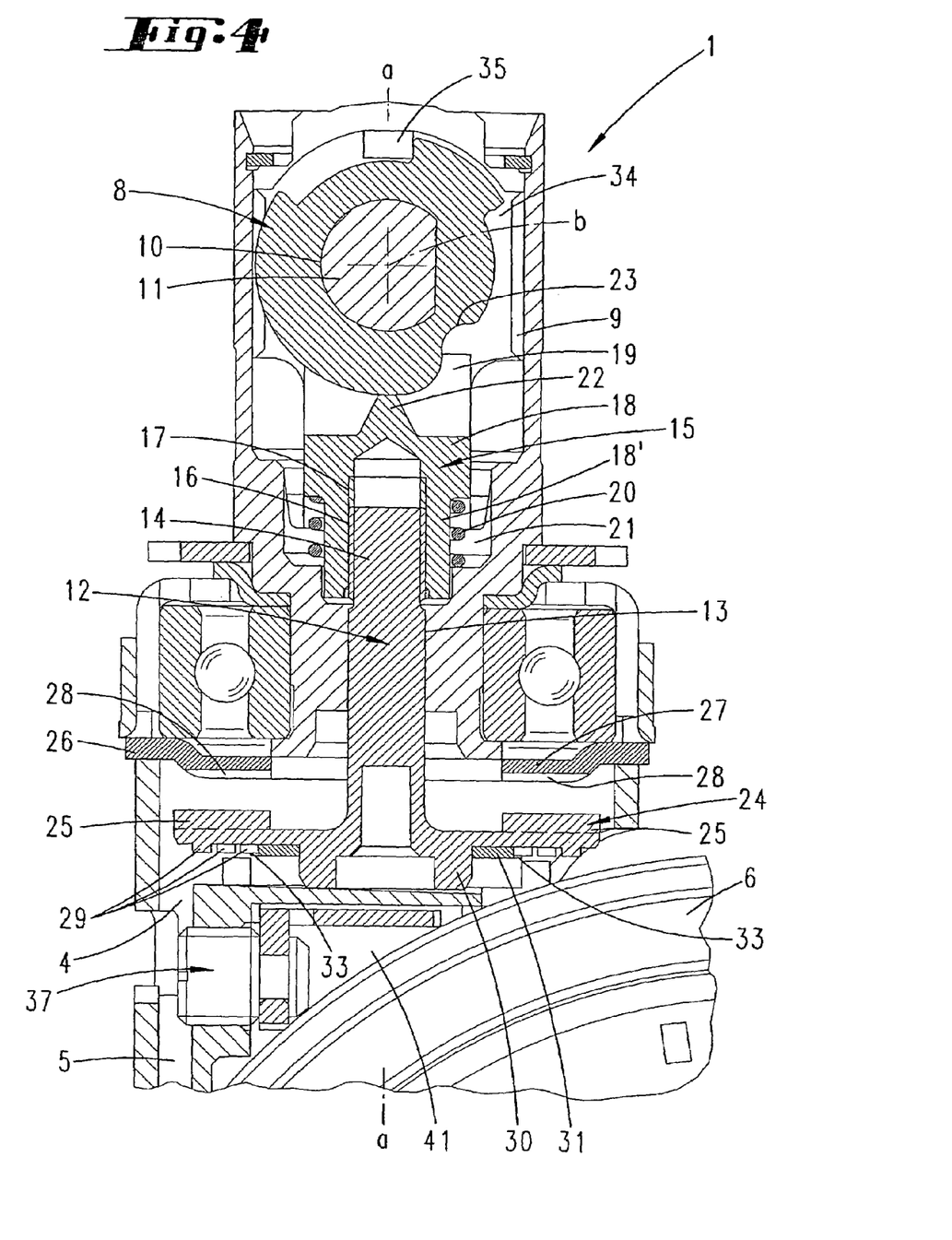
FIG. 4 shows a sectional illustration like the illustrations in FIGS. 3 and 2, total blocking of the caster and of the running wheel having been achieved in this case by means of rotary actuation of the control cam and an accompanying lowering movement of the push rod.

In order to achieve full locking of the caster 1 or of the running wheel 6, the control cam 8 is rotated in the direction of rotation x via the control-lever shank 11. The control cam here is mounted in a stop-limited manner within the mounting pin 3 such that the control cam 8, as seen in the illustrations, has a circumferentially directed depression 34 which is disposed above the actuating axis b and into which a housing-mounted pin 35 projects with locking action, the pin interacting with the side flanks of the depression 34 in each case. It can be seen in FIGS. 2 and 3 that the control cam 8 need not be actuated in order for the caster 1 to perform its fixed-caster function or steering caster function. FIG. 4 shows the full-locking position of the caster 1. It can be seen here that the control cam 8 has been rotated in a stop-limited manner in the direction x, and a circumferentially directed control cam face 36, which follows the control hollow 23 of the control cam 8, lowers the mating cam 22 and the push rod 12 connected thereto, vertically counter to the force of the compression spring 20. The oblique side flanks of the mating cam 22 ensure that the control cam 8 displaces the push rod 12 downward in the correct manner via the control cam face 36. During the vertical downward displacement of the push rod 12, this displacement being guided by the cavities 19 and 21 and the push-rod passage 13, the latching structures 25 are spaced apart, without contact, from the direction-locking part 26. The rotation-blocking protrusions 29, which project from the latching plate 24 beneath the latching structures 25, enter with rotary locking action into the blocking receivers 33 of the blocking part 31, the blocking receivers being oriented in a congruent manner with the blocking protrusions. In this case, the underside of the latching plate 24 rests face-to-face on the blocking part 31. The caster 1 is thus blocked in terms of rotation about the pivot axis a. During the lowering movement, the extension 30 of the push rod 12 passes through the opening 31' of the blocking part 31 and acts on a braking device 37 disposed above the running wheel 6 in the fork cavity 5. The braking device 37 has respective bearing extensions 38 and 38' by means of which it is mounted on the fork legs 4. For this purpose, the fork legs 4 each have apertures in the form of windows 39 and 39' (see FIG. 1) which are disposed one beneath the other and opposite one another in each case and are oriented transversely to the pivot axis a. It is also the case that the cage-like extension arms 32 of the blocking part 31 are positioned in the windows 39 such that they cannot be rotated or displaced. The bearing extensions 38 of the braking device 37 are positioned in the cagelike extension arms 32. The bearing extensions 38', which interact with hairpin springs 40 in each case, are positioned in the windows 39' of the fork legs 4, in each case one spring arm of the hairpin springs 40, which are directed toward one another, being supported on the bearing extensions 38. The other spring arm respectively of the hairpin springs 40 is supported on the periphery of the windows 39' of the fork legs 4. The braking device 37 is thus spring-biased when the push rod 12 is lowered. The actual braking element for the running wheel 6 is a brake block 41 which is disposed in the braking device 37 and, during the downward displacement, effects braking action on the running surface of the running wheel 6. Furthermore, the engagement force or the braking force of the brake block 41 can be lastingly adjusted by the brake block 41 being secured on the braking device 37 by means of a screw-connection. By means of this screw-connection, the brake block 41 can be displaced linearly, that is to say as seen transversely to the pivot axis a, in the direction of the running surface of the running wheel 6. In order for the screwing element to be operated by means of a suitable screwing tool, a correspondingly configured opening is provided in the fork 2.

In the case of the caster 1 which is illustrated here, the control cam 8 has just two control positions: a non-actuated, inoperative position, in which the caster 1 can be utilized either as a steering caster or as a fixed caster, or a pivoted operative position, in which case the push rod 12 is then biased in the direction of the control cam 8 by means of the hairpin springs 40 and/or the compression spring 20. If full blocking is released to give the position of the control cam 8 as seen in the illustration in FIGS. 2 and 3, the force of the compression spring 20 and of the hairpin springs 40 has displaced the push rod 12 and the mating cam 22 in the direction of the control cam 8 and into the control hollow 23, respectively. Depending on the angle at which the caster is oriented, it is either the case, in order for the caster 1 to perform the steering caster function, that the latching structures 25 are supported once again on the underside of the latching plate 24 or, in order for the caster 1 to perform the fixed-caster function, that the latching structures 25 enter with locking action into the latching recesses 28.

All features disclosed are (in themselves) pertinent to the invention. The disclosure content of the associated/attached priority documents (copy of the prior application) is hereby also included in full in the disclosure of the application, also for the purpose of incorporating features of these documents in claims of the present application.

The invention claimed is:

1. A caster comprising:
   a running wheel;
   a fork bearing said running wheel;
   a mounting pin extending from said fork, said fork being pivotable relative to said mounting pin;
   a braking device disposed in said fork;
   a push rod housed within said mounting pin for displacing said braking device into a braking position, said push rod comprising a plurality of rotation blocking protrusions and an extension;
   a blocking part disposed in said fork, said blocking part having an opening sized to receive said extension, wherein said braking device is formed separately from said blocking part and said extension passes through said blocking part in the braking position for acting on said braking device;

a control cam received within said mounting pin for actuating said push rod; and a direction-locking part mounted on said fork, wherein said push rod interacts with said direction-locking part and is biased by a spring into a direction-locking position.

2. Caster according to claim 1, wherein said push rod has a latching structure which interacts with a latching recess of said direction-locking part.

3. Caster according to claim 2, wherein said latching structure is formed on a latching plate formed integrally with said push rod.

4. Caster according to claim 3, wherein said plurality of rotation-blocking protrusions are disposed on said latching plate in an opposite direction to said latching structure.

5. Caster according to claim 3, wherein at least one of said blocking part and said direction-locking part is formed as a metal part and at least one of said braking device that and a portion of said push rod having said latching plate formed integrally therewith is formed as a plastics part.

6. Caster according to claim 1, wherein the direction-locking position can be eliminated solely by a torque acting on said running wheel.

7. Caster according to claim 1, wherein said plurality of rotation-blocking protrusions engage in blocking receivers of said blocking part when said push rod is lowered.

8. Caster according to claim 1, wherein in an upper part, said push rod is formed as a mating cam in relation to said control cam.

9. Caster according to claim 8, wherein said mating cam is formed on a separate cam part and is screw-connected to a portion of said push-rod having a latching structure.

10. Caster according to claim 1, wherein said push rod is spring-biased in a direction of said control cam.

11. Caster according to claim 10, wherein said spring acts on a cam part.

12. Caster according to claim 1, wherein said control cam has two control positions, wherein one of said two control positions is said direction-locking position.

13. Caster according to claim 12, wherein one of said two control positions of said control cam defines the direction-locking position, and said braking device is activated via another of said two control positions.

* * * * *